US006795375B2

(12) United States Patent
Streja (10) Patent No.: US 6,795,375 B2
(45) Date of Patent: Sep. 21, 2004

(54) PROGRAMMABLE ELECTRONIC TIMER BASED ON LINEAR OR NON-LINEAR PROGRAMMABLE FUNCTIONS

(76) Inventor: Dan Streja, 120 Aqueduct Dr., Scarsdale, NY (US) 10583

( * ) Notice: Subject to any disclaimer, the term of this patent is extended or adjusted under 35 U.S.C. 154(b) by 362 days.

(21) Appl. No.: 09/815,910

(22) Filed: Mar. 23, 2001

(65) Prior Publication Data

US 2003/0021189 A1 Jan. 30, 2003

(51) Int. Cl.[7] ........................... G04B 47/00; G09B 11/00
(52) U.S. Cl. ........................ 368/10; 368/109; 368/110; 434/322
(58) Field of Search ............................. 368/3, 10, 62, 368/82–84, 107–113, 250, 251; 377/20; 434/322, 323, 335

(56) References Cited

U.S. PATENT DOCUMENTS

| | | | | |
|---|---|---|---|---|
| 4,337,047 A | * | 6/1982 | Hatta ........................... | 434/201 |
| 4,337,529 A | * | 6/1982 | Morokawa ................... | 368/10 |
| 4,451,158 A | * | 5/1984 | Selwyn et al. ................ | 368/63 |
| 4,510,485 A | * | 4/1985 | Tahara ..................... | 340/323 R |
| 5,140,564 A | * | 8/1992 | Rich .......................... | 368/107 |
| 5,274,610 A | * | 12/1993 | Tonomura et al. ............ | 368/10 |
| 5,642,334 A | * | 6/1997 | Liberman .................... | 368/10 |
| 5,796,681 A | * | 8/1998 | Aronzo ........................ | 368/10 |

* cited by examiner

Primary Examiner—Vit W. Miska (57) ABSTRACT

A programmable electronic timer for measuring time based on linear or non-linear programmable functions comprising a display, a button keyboard pad, an electronic memory that contains the function definition and function parameters for each section of time, an electronic clock that generates equally spaced impulses, an arithmetric logical computation unit that converts equally spaced time impulses from the clock to linearly or non-linearly spaced time impulses, based on functions stored in memory, that are feed to the logical unit for transformation, and a start/stop button that switches modes from input mode to running mode and back.

A preferred embodiment includes a watch-like or a calculator-like body which can be programmed to help pace student efforts during a exams such as the SAT by displaying the current section number, the time within sections, and the question number that the student should be concentrating on.

20 Claims, 6 Drawing Sheets

PROGRAMMABLE ELECTRONIC TIMER BASED ON LINEAR OR NON-LINEAR PROGRAMMABLE FUNCTIONS

A programmable electronic timer based on linear or non-linear programmable functions is a machine that can be programmed to time certain activities based on specific functions. Thus, as opposed to regular timers, which produce an event after some time has passed, this device will produce events based on a functional transformation of time. An application described therein is a programmable timer to be used by students taking the SAT test.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates generally to the field of timing devices, and more particularly to a programmable timer for measuring time based on linear or non-linear programmable functions.

This device can be programmed to time certain activities based on specific functions. Thus, as opposed to regular timers, which produce an event after a certain time interval has passed, this device will produce events based on a functional transformation of time. An application described therein is a programmable timer to be used by students taking the SAT test.

NOTE: In this document, the word "section" refers to:
1. A section of time that can be programmed with a function using this invention.
2. A section of an exam, as part of the exam. A section of the exam can be covered by several programmed sections of the device. The total time allocated for these programmed sections of the device will be equal to the time reserved for that section of the exam.

Currently, during exams, students use a regular watch to time their efforts. Even when the questions are grouped by difficulty and the effort is predictable, it is still very difficult to figure out if there is enough time to finish or not. Students use calculators and watches, but none of them help to pace their efforts.

Calculators have a similar setup in terms of hardware, but do not have the capability to program functions with true current time as the independent variable.

Watches display time, but do not allow any alteration or programming. Stopwatches allow measuring time intervals, but do not allow any alteration or programming.

None of these devices adapt to the effort required for the task, allowing longer time for higher expected effort and shorter time for easier tasks.

BRIEF SUMMARY OF THE INVENTION

The primary object of the invention is to provide a device that helps humans match their effort with tasks that vary in intensity and difficulty.

The invention therefore provides a programmable machine for measuring time based on linear or non-linear programmable functions, comprising a data entry unit to input parameters that describe mathematical positive, monotonic functions, an arithmetic logical computation unit that performs operations on numeric data, by computing the programmed function, using time as the independent variable, a memory for storing numeric parameters for functions, counters of timer events, sections, results of function computation and mode selection, and a clock that generates equally spaced impulses, that are fed to the arithmetic logical unit for transformation.

Another object of the invention is to provide a device that helps humans maximize performance for tasks that vary in intensity and difficulty, by repeating the tasks, measuring the effort and tuning the pacing of the effort.

Another object of the invention is to provide a device that helps a machine match output with an input that is non-linear and predictable in time.

A further object of the invention is to provide a device that allows students taking an exam to pace their efforts and maximize score.

Yet another object of the invention is to allow students to know if they are ahead or behind during exams and apply a better strategy for skipping questions and guessing answers.

Still yet another object of the invention is to allow students to take advantage of prior knowledge about the difficulty of questions and their ordering based on difficulty and pace the exam accordingly.

Another object of the invention is to allow students to tune their performance based on previous tests, reserving adequate amount of time for questions and avoiding panic.

Another object of the invention is to allow runners for long races, such as a marathon, to pace their efforts better, conserve energy, sprint at a moment that is convenient for them.

A further object of the invention is to allow recipients of medicine to tune delivery based on personal effort.

Yet another object of the invention is to allow heating to match nonlinear, predictable change in the temperature of the environment.

Other objects and advantages of the present invention will become apparent from the following descriptions, taken in connection with the accompanying drawings, wherein, by way of illustration and example, an embodiment of the present invention is disclosed.

A programmable machine for measuring time based on linear or nonlinear programmable functions comprising: a display, a button keyboard pad, an electronic memory that contains the function definition and function parameters for each section of time, a Logical Computation Unit that converts equally spaced time impulses from the clock to linearly or non-linearly spaced time impulses, based on functions stored in memory, an electronic clock that generates equally spaced impulses, that are fed to the logical unit for transformation, and a start/stop button that switches modes from input mode to running mode and back.

A programmable machine for measuring time for exam events such as the SAT or PSAT with a purpose of improving student performance, comprising Display, data entry unit having Button pad keyboard comprising mode entry selection buttons, section selection buttons, option selection buttons, numeric buttons, Electronic memory that stores running parameters for each section of time, Logical Computation Unit that converts equally spaced time impulses from the clock to question counter increases based on a programmable function, Clock that generates equally spaced impulses, and Start/Stop button that switches mode from input mode to running mode.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The timers introduced by this invention separate a certain large interval of time into several sections. For each section, timer events are produced based on a programmed function. This function can be dynamically programmed (programmed by the user each time the timer is used) or can be preprogrammed. The function has to be a positive monotonic function. The independent variable of the function is time, generated by an electronic clock. The dependent variable is represented by time events, generated by a logic unit that computes the value of the function and generates a timer event each time the integer value of the function increases.

The following table examples illustrate this concept.

Table 50 presents what timer events are created when the programmed function is the identity function y=x. In this case, the timer will behave as a normal timer.

TABLE 50

| Regular time. Transformation function y = x (normal time) | | |
|---|---|---|
| Time (in seconds) | Function y = x (regular time) | Timer Events |
| 0.1 | 0.1 | |
| 0.2 | 0.2 | |
| 0.3 | 0.3 | |
| 0.4 | 0.4 | |
| 0.5 | 0.5 | |
| 0.6 | 0.6 | |

TABLE 50-continued

| Regular time. Transformation function y = x (normal time) | | |
|---|---|---|
| Time (in seconds) | Function y = x (regular time) | Timer Events |
| 0.7 | 0.7 | |
| 0.8 | 0.8 | |
| 0.9 | 0.9 | |
| 1 | 1 | tick |
| 1.1 | 1.1 | |
| 1.2 | 1.2 | |
| 1.3 | 1.3 | |
| 1.4 | 1.4 | |
| 1.5 | 1.5 | |
| 1.6 | 1.6 | |
| 1.7 | 1.7 | |
| 1.8 | 1.8 | |
| 1.9 | 1.9 | |
| 2 | 2 | tick |
| 2.1 | 2.1 | |
| 2.2 | 2.2 | |
| 2.3 | 2.3 | |
| 2.4 | 2.4 | |
| 2.5 | 2.5 | |
| 2.6 | 2.6 | |
| 2.7 | 2.7 | |
| 2.8 | 2.8 | |
| 2.9 | 2.9 | |
| 3 | 3 | tick |
| 3.1 | 3.1 | |
| 3.2 | 3.2 | |
| 3.3 | 3.3 | |
| 3.4 | 3.4 | |
| 3.5 | 3.5 | |
| 3.6 | 3.6 | |
| 3.7 | 3.7 | |
| 3.8 | 3.8 | |
| 3.9 | 3.9 | |
| 4 | 4 | tick |

Table 60 presents what timer events are created when the programmed function is the linear function y=2x, a function that speeds up time. Timer events in this case are generated every half a second.

TABLE 60

| Linear Speeding up time. Transformation function y = 2*x (speeding up) | | |
|---|---|---|
| Time (in seconds) | Function y = 2*x (speeding up) | Timer Events |
| 0.1 | 0.2 | |
| 0.2 | 0.4 | |
| 0.3 | 0.6 | |
| 0.4 | 0.8 | |
| 0.5 | 1 | tick |
| 0.6 | 1.2 | |
| 0.7 | 1.4 | |
| 0.8 | 1.6 | |
| 0.9 | 1.8 | |
| 1 | 2 | tick |
| 1.1 | 2.2 | |
| 1.2 | 2.4 | |
| 1.3 | 2.6 | |
| 1.4 | 2.8 | |
| 1.5 | 3 | tick |
| 1.6 | 3.2 | |
| 1.7 | 3.4 | |
| 1.8 | 3.6 | |
| 1.9 | 3.8 | |
| 2 | 4 | tick |
| 2.1 | 4.2 | |
| 2.2 | 4.4 | |
| 2.3 | 4.6 | |
| 2.4 | 4.8 | |
| 2.5 | 5 | tick |
| 2.6 | 5.2 | |

TABLE 60-continued

Linear Speeding up time. Transformation function y = 2*x (speeding up)

| Time (in seconds) | Function y = 2*x (speeding up) | Timer Events |
|---|---|---|
| 2.7 | 5.4 | |
| 2.8 | 5.6 | |
| 2.9 | 5.8 | |
| 3 | 6 | tick |
| 3.1 | 6.2 | |
| 3.2 | 6.4 | |
| 3.3 | 6.6 | |
| 3.4 | 6.8 | |
| 3.5 | 7 | tick |
| 3.6 | 7.2 | |
| 3.7 | 7.4 | |
| 3.8 | 7.6 | |
| 3.9 | 7.8 | |
| 4 | 8 | tick |

Table 70 presents what timer events are created when the programmed function is the linear function y=0.5x, a function that slows down time. Timer events in this case are generated every two seconds.

TABLE 70

Slowing down time. Transformation function y = ½*x

| Time (in seconds) | Function y = ½*x (slowing down) | Timer Events |
|---|---|---|
| 0.1 | 0.05 | |
| 0.2 | 0.1 | |
| 0.3 | 0.15 | |
| 0.4 | 0.2 | |
| 0.5 | 0.25 | |
| 0.6 | 0.3 | |
| 0.7 | 0.35 | |
| 0.8 | 0.4 | |
| 0.9 | 0.45 | |
| 1 | 0.5 | |
| 1.1 | 0.55 | |
| 1.2 | 0.6 | |
| 1.3 | 0.65 | |
| 1.4 | 0.7 | |
| 1.5 | 0.75 | |
| 1.6 | 0.8 | |
| 1.7 | 0.85 | |
| 1.8 | 0.9 | |
| 1.9 | 0.95 | |
| 2 | 1 | tick |
| 2.1 | 1.05 | |
| 2.2 | 1.1 | |
| 2.3 | 1.15 | |
| 2.4 | 1.2 | |
| 2.5 | 1.25 | |
| 2.6 | 1.3 | |
| 2.7 | 1.35 | |
| 2.8 | 1.4 | |
| 2.9 | 1.45 | |
| 3 | 1.5 | |
| 3.1 | 1.55 | |
| 3.2 | 1.6 | |
| 3.3 | 1.65 | |
| 3.4 | 1.7 | |
| 3.5 | 1.75 | |
| 3.6 | 1.8 | |
| 3.7 | 1.85 | |
| 3.8 | 1.9 | |
| 3.9 | 1.95 | |
| 4 | 2 | tick |

Table 80 presents what timer events are created when the programmed function is the non-linear function y=exp(x). This function will provide more and more timer events as time passes.

TABLE 80

Non-linear transformation: y = exp(x)

| Time (in seconds) | Function y = exp(x) | Timer Events |
|---|---|---|
| 0.1 | 1.105171 | tick |
| 0.2 | 1.221403 | |
| 0.3 | 1.349859 | |
| 0.4 | 1.491825 | |
| 0.5 | 1.648721 | |
| 0.6 | 1.822119 | |
| 0.7 | 2.013753 | tick |
| 0.8 | 2.225541 | |
| 0.9 | 2.459603 | |
| 1 | 2.718282 | |
| 1.1 | 3.004166 | tick |
| 1.2 | 3.320117 | |
| 1.3 | 3.669297 | |
| 1.4 | 4.0552 | tick |
| 1.5 | 4.481689 | |
| 1.6 | 4.953032 | |
| 1.7 | 5.473947 | tick |
| 1.8 | 6.049647 | tick |
| 1.9 | 6.685894 | |
| 2 | 7.389056 | tick |
| 2.1 | 8.16617 | tick |
| 2.2 | 9.025013 | tick |
| 2.3 | 9.974182 | |
| 2.4 | 11.02318 | tick,tick |
| 2.5 | 12.18249 | tick |
| 2.6 | 13.46374 | tick |
| 2.7 | 14.87973 | tick |
| 2.8 | 16.44485 | tick,tick |
| 2.9 | 18.17415 | tick,tick |
| 3 | 20.08554 | tick,tick |
| 3.1 | 22.19795 | tick,tick |
| 3.2 | 24.53253 | tick,tick |
| 3.3 | 27.11264 | tick,tick,tick |
| 3.4 | 29.9641 | tick,tick |
| 3.5 | 33.11545 | tick,tick,tick,tick |
| 3.6 | 38.59823 | tick,tick,tick |
| 3.7 | 40.4473 | tick,tick,tick,tick |
| 3.8 | 44.70118 | tick,tick,tick,tick |
| 3.9 | 49.40245 | tick,tick,tick,tick,tick |
| 4 | 54.59815 | tick,tick,tick,tick,tick |

The presentation of programmed functions in this table is just an example. The independent variable (time) can be measured in any unit, not just seconds and the principle of applying a function to it is the same. The timer generates time events for the first section applying the first function and, when the time expires for the first section, the timer will advance to the second section and apply the second function for the timer events, and so on. Associated with each section is a flag that indicates if the time counter should be reset when the section begins, bringing the independent variable back to 0.

Figure 1:
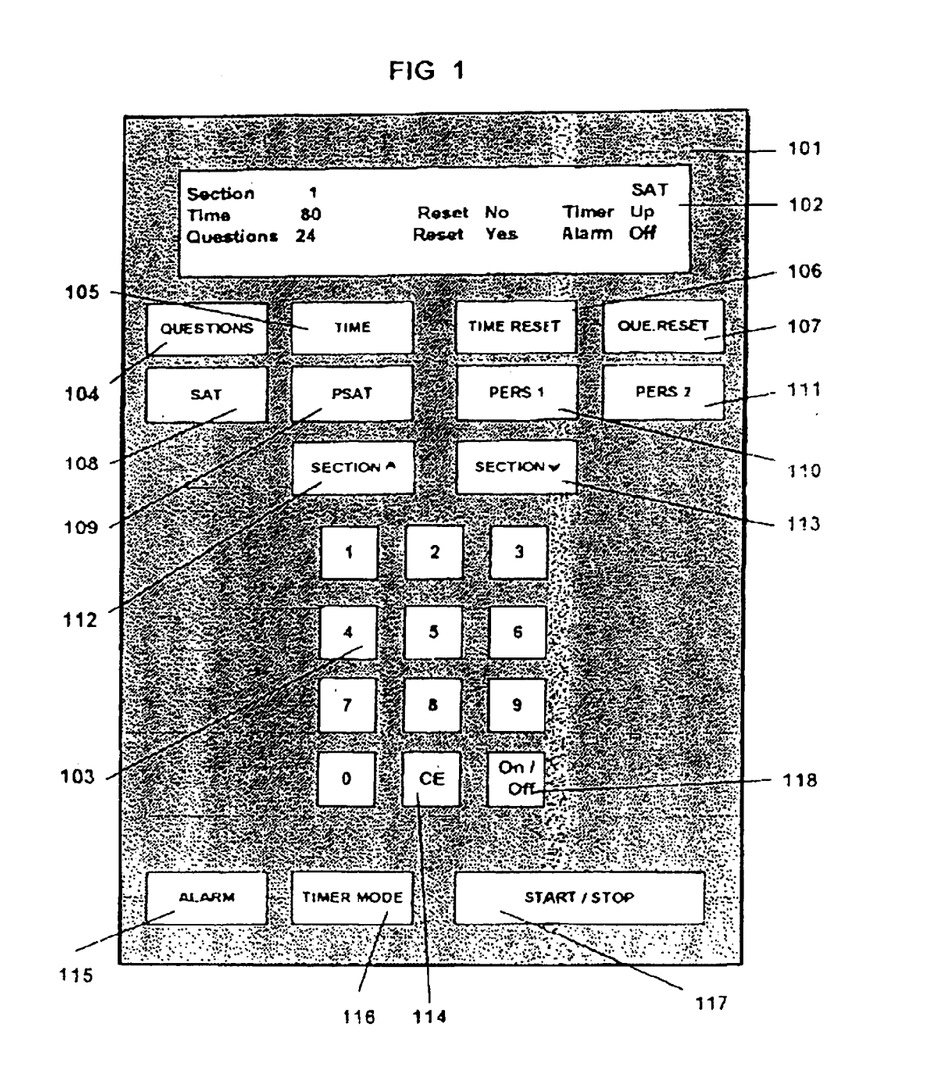
FIG. 1 is a plan view of the invention, with a physical appearance similar to a calculator, in setting mode.

Referring to FIG. 1, a portable electronic timer of the type that may employ the features of this invention is shown in pictorial form. Its embodiment is similar to a portable electronic calculator. This particular embodiment of the invention is to be used in timing standardized tests, such as the SAT and the PSAT. These tests have a pre-determined number of sections. For each section, there are several groups of questions. Each group of questions is comprised by easy questions, medium difficulty questions and hard questions, in that order. It is difficult for the student taking these standardized tests to pace the effort, since more time is needed for the hard questions than for the easy one. Some students, who very rarely are able to answer hard questions, may forego answering all or some of the hard questions and spend time for the easy questions and more time for the medium difficulty questions, in order to maximize their score. This electronic timer will show them what question they are supposed to be answering at any particular time. This information will allow them to think more about the question, guess, or skip the question depending of their being ahead or behind the question displayed by the timer.

The electronic timer 101 comprises a liquid crystal display 102, a data entry unit having button keyboard pad which comprises a questions set button 104, a time set button 105, a timer reset button 106, a section reset button 107, an SAT presetting button 108, a PSAT presetting button 109, two personal presetting memory buttons 110 and 111, two section setting buttons 112 and 113, numeric keypad with keys 0–9 103, a clear entry button 114, an alarm setting button 115, a timer mode button 116 a Start/Stop button 117 and an On/Off button 118.

The operation of the device is as follows:

The user will turn the device on from the On/Off button 118. The display will show:

| Section 1 | | PERS1 |
|---|---|---|
| Time 0 | Reset No | Timer Down |
| Questions 0 | Reset No | Alarm Off |

The user will press Time (button 105) The display will blink the Time setting.
The user will enter the time, in minutes allocated for this section. Setting the time in minutes is particular to this application. Different applications may use different time measurements. Then the user will press Questions (button 104). The display will blink the Question setting. The user will set the number of questions for that section.

Then the user will decide if the timer will be reset at the beginning of this section by pressing the Time Reset button 106. This button toggles the Time Reset setting for the section. Then the user will decide if the question counter will be reset at the beginning of this section by pressing the Que. Reset button 107. This button toggles the Questions Reset setting for the section. When the timer is in the running mode, at the beginning of a section that indicates Time Reset, the displayed timer will start again from 0. This feature allows the user to time independently test sections, each of which is constituted of several timer sections. Each timer section corresponds to a sub-group of questions of the test section. When the timer is in the running mode, at the begging of a section that indicates Question Reset, the displayed question starts again at 1. This feature allows the user to see to question counting independently for each test section.

Then the user will user the Section UP and DOWN buttons to advance to the next section and set it in a similar manner.

At any time, the user can select the Timer Mode by pressing on the Timer Mode button. If the timer mode is set to UP, the time displayed will go from 0 to the total for all the sections that do not require a timer reset. If the timer mode is set to DOWN, the time displayed is the sum of the specified time for all the sections up to the next section programmed for Time Reset. The time goes down from there and reaches 0 at the end that group of sections. This allows the user to know how much time is left for a certain test section.

Sections that have the Time set to 0 will be skipped independently of setting of the Questions. Sections that have the Time set to a non-zero value, but the questions set to a 0 value, will consume the time specified, without increasing or modifying the Questions number. They are to be used to program the pauses in the test.

Figure 2:
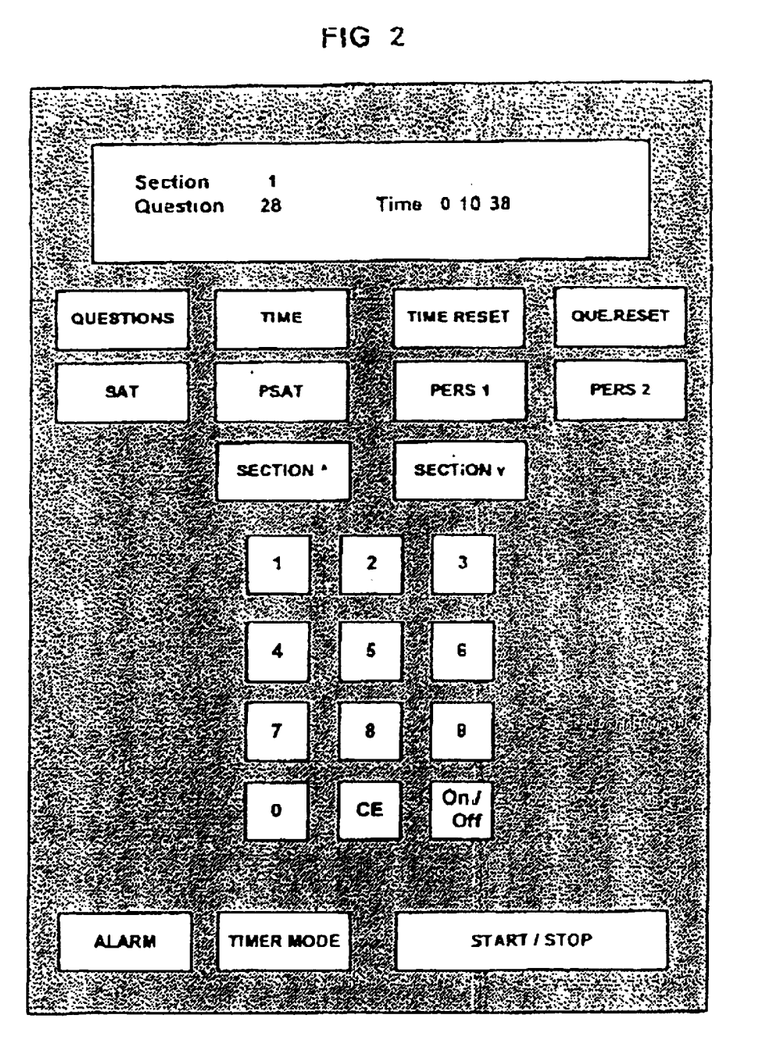
FIG. 2 is a plan view of the invention, with a physical appearance similar to a calculator, in running mode.

After all the desired sections are programmed, the user can select, using the Section UP and Section DOWN buttons 112 and 113, the section from which to start the timer, then the user can press the Start/Stop button 117. This will start the timer and the screen will change to display the question.

This particular embodiment of the solution uses linear time functions. The slope of the linear function is determined by the duration of the section and the programmed number of questions per section. The timer section of the programmed prototype provides an example of how the logical unit may be built.

Figure 6:
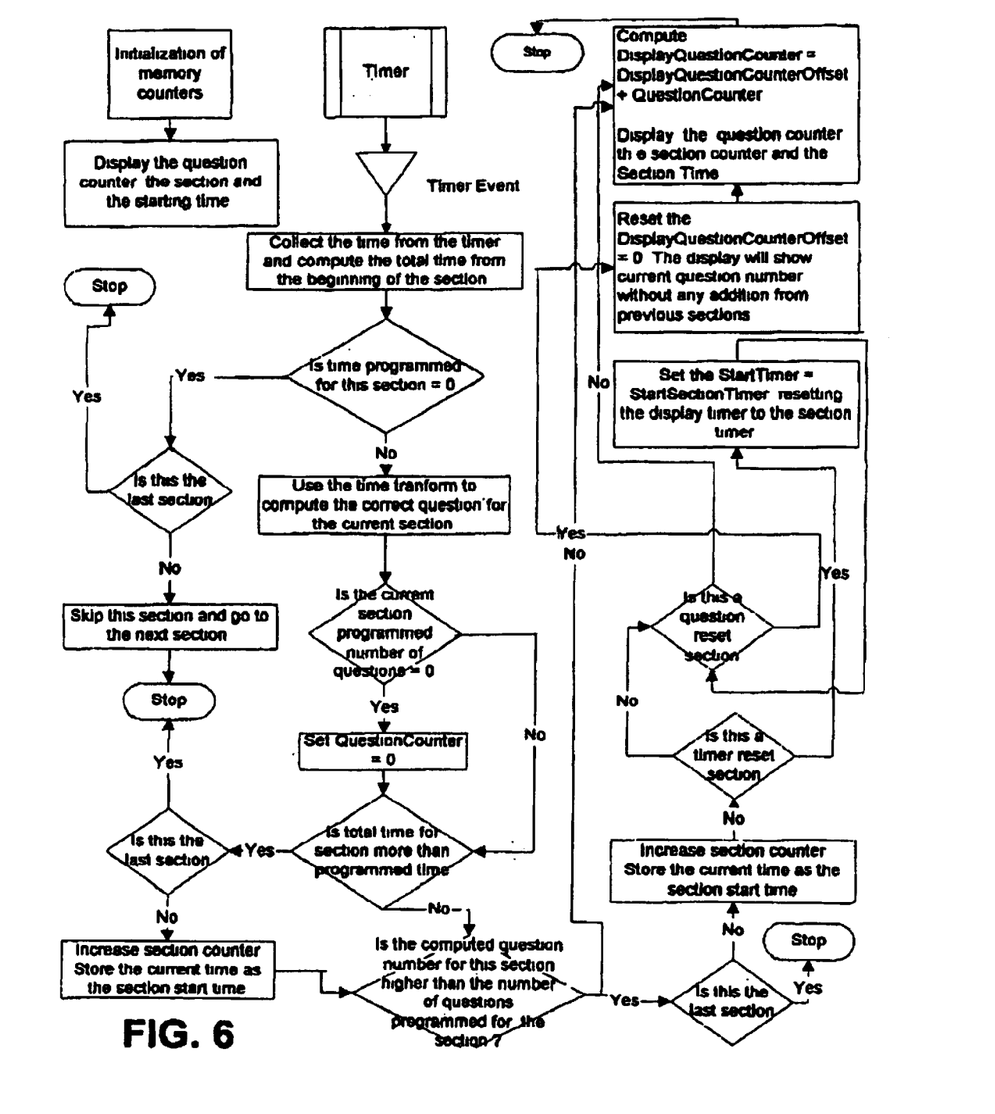
FIG. 6 is a flow chart of the operations that are performed by the logical unit.

The following is Visual Basic commented code, detailing the functionality of the logical unit. The logical unit will execute by hardware the same or similar logic functionality as described by this software. This prototype does not support the TimerMode DOWN. All other limitations of the prototype compared with the described electronic timer from FIG. 1 are described in the code comments.

Figure 3:
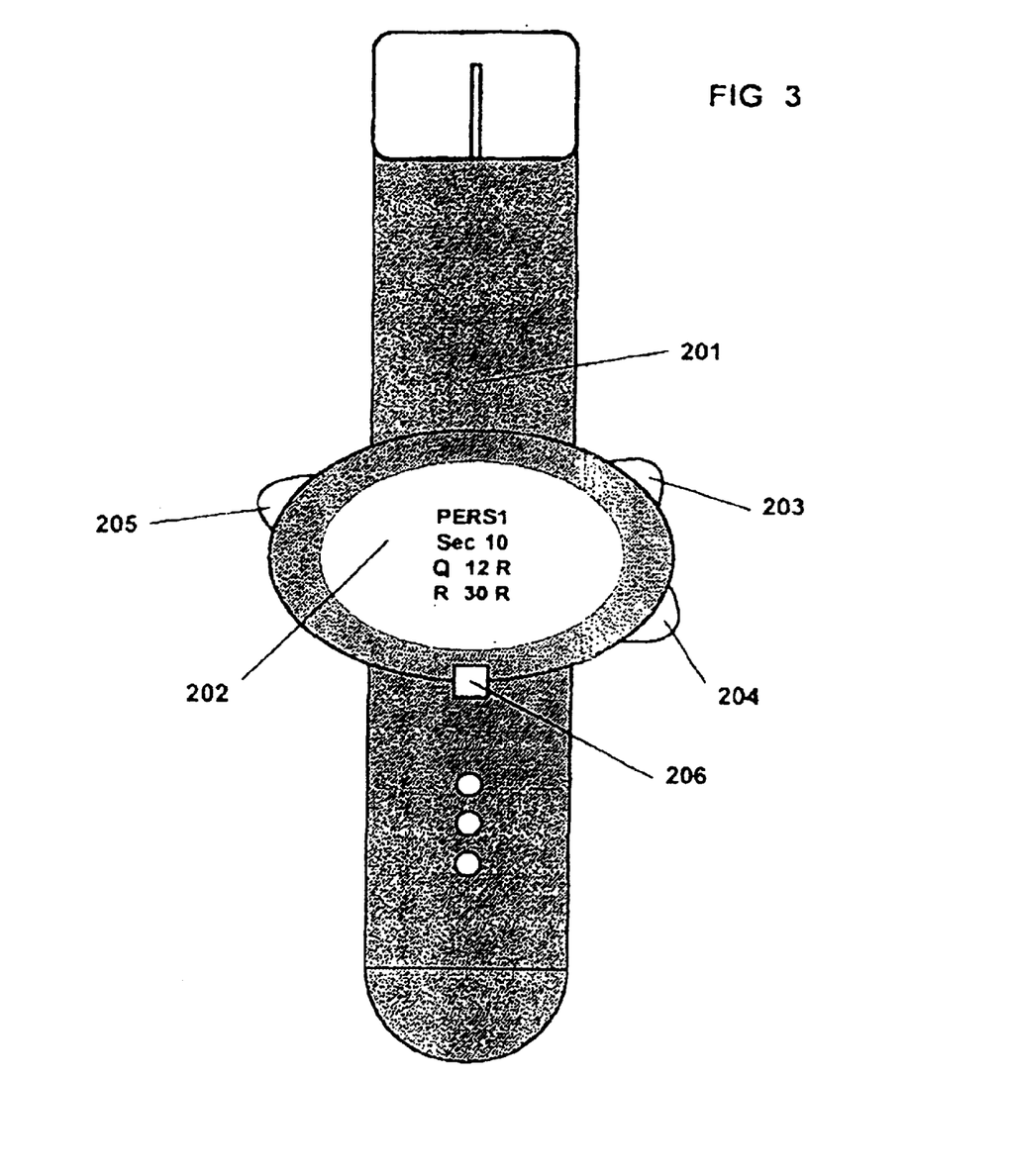
FIG. 3 is a plan view of the invention, with a physical appearance similar to a wristwatch, in setting mode.

Referring to FIG. 3, a portable electronic timer of the type that may employ the features of this invention is shown in pictorial form. Its embodiment is similar to a wristwatch. The electronic timer 201 comprises a liquid crystal display 202, a button keyboard pad which comprises a setting button 203, an exam setting button 204, an Up/Down button 205 and a start/stop button 206.

The operation of the device is as follows:
The device is always on. The display will show.

| Sec 1 | | PERS1 |
|---|---|---|
| Q: 0 | R | |
| T: 0 | R | |

The user will select first which memory group is to be programmed by using the exam setting button. Pressing the button will circle SAT/PSAT/PERS1/PERS2 settings. The setting will be displayed on the screen.

The user will press the setting button. The display will blink the Sec setting. The user use the Up/Down button to change the number displayed from 0 to the desired number of the section to be programmed.

The user will press the setting button. The display will blink the T setting. The user use the Up/Down button to change the number displayed from 0 to the desired number of minutes. Setting the time in minutes is particular to this application. Different applications may use different time measurements. Then the user will press again the setting button. The display will blink the Q setting. The user use the Up/Down button to change the number displayed from 0 to the desired number of questions. Then the user will press again the setting button. The display will blink the R setting next to T, The user will use the Up/Down button to change the setting from R (Reset) to blank (non-Reset) for the time counter. The Up/Down button will work as a toggle in this case. Then the user will press again the setting button. The display will blink the R setting next to Q; the user will use the Up/Down button to change the setting from R (Reset) to blank (non-Reset) for the question counter. The Up/Down button will work as a toggle in this case.

Figure 4:
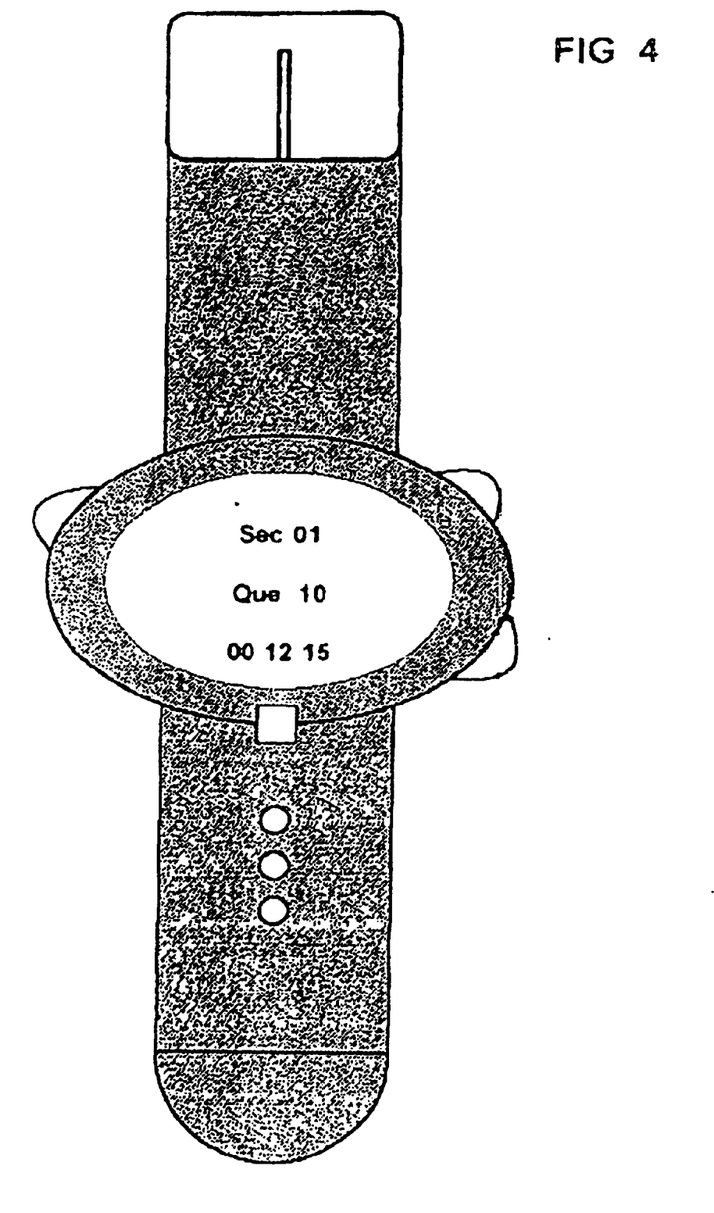
FIG. 4 is a plan view of the invention, with a physical appearance similar to a wristwatch, in running mode.
Figure 5:
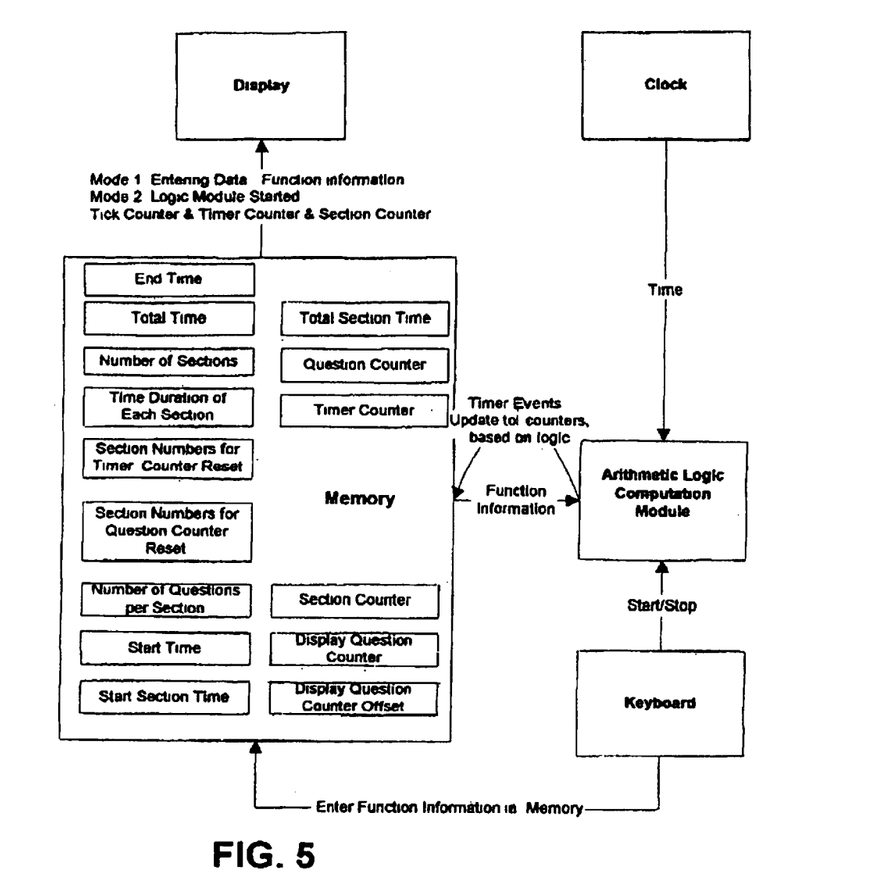
FIG. 5 is a schematic diagram illustrating the data flow between the elements of the invention.

The programming can continue with the following section. After all the sections have been programmed, the device is ready to run. The timer starts upon pressing the Start/Stop button, changing the mode of operation to the running node. Upon another press of the Start/Stop button, the mode changes again to the setting mode.

This embodiment does not have the Timer Mode and the Alarm Mode.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

COMPUTER PROGRAM CODE APPENDIX

```
'Initialization setting the counters. Unlike the described device, the
'prototype always starts with section 1 and has only 6 sections.
QuestionCounter = 1
DisplayQuestionCounter = 0
DisplayQuestionCounterOffset = 0
SectionCounter = 0
CurrentSeconds = 0
CurrentMinutes = 0
'Read the current computer time, the clock time
StartTimer = Timer
StartSectionTimer = StartTimer
'display the section counter, the question counter and the starting time.
If (QuestionArray(SectionCounter) = 0) Then
    Text1.Text = ""
Else
    Text1.Text = QuestionCounter
End If
Text3.Text = SectionCounter + 1
Text4.Text = "00:00"
'Clock Event - the clock is programmed to create events much more
'often than the minimal time unit programmable by the user
'In this case, the clock event is created every 10 ms, while the minimal
'time unit programmable by the 'user is 1 minute.
'display time in section, first collect the current time from the clock
EndTime = Timer
'total time from the beginning of the group of sections, unit timer reset
TotalTime = EndTime - StartTimer
'total time from the beginning of the current section
TotalSectionTime = EndTime - StartSectionTimer
'If the specified time is 0, skip the section; if it is the last section,
'stop the running mode, otherwise compute what question from the current
'section should be displayed.
    If TimeArray(SectionCounter) <= 0 Then
        SectionCounter = SectionCounter + 1
        StartSectionTime = EndTime 'set to current time
        If SectionCounter >= MAX_SECTIONS Then
            Beep
            MsgBox ("End of Sequence")
            Unload Form1
        End If
        Exit Sub
    Else
        'Increase section time
        QuestionCounter =
TimeTransform(TimeArray(SectionCounter),
        QuestionArray(SectionCounter), TotalSectionTime)
    End If
'if the number of questions programmed for the current section is 0, then
'the QuestionCounter is kept to 0 for the section and the TotalSectionTime
'is compared to the programmed time for the section. The 60 multiplier is
'used to transform the time from minutes to seconds, to match the
'TotalSectionTime units. When the time expires, the timer will move to the
'next section.
    If (QuestionArray(SectionCounter) = 0) Then
        QuestionCounter = 0
        If TotalSectionTime > 60 * TimeArray(SectionCounter)
Then
            SectionCounter = SectionCounter + 1
            StartSectionTime = EndTime ' set to current time
            If SectionCounter >= MAX_SECTIONS Then
                Beep
                MsgBox ("End of Sequence")
                Unload Form1
            End If
            Exit Sub
        End If
    End If
'if the question number for this section is higher than the number of
```

-continued

COMPUTER PROGRAM CODE APPENDIX

```
'questions requested for the section, it is time for a section increase.
'the timer moves to the next section. The section start timer is set to
'the current time. The timer displayed and the question displayed are
'reset, if so programmed.
'the DisplayQuestionCounterOffset keeps track of the questions in
'previous sections, that need to be added to the questions in the current
'section, before a question number is displayed. The QuestionCounter,
'which stores the number of the question to be displayed from the current
'section is set back to 1.
If QuestionCounter > QuestionArray(SectionCounter) Then
    SectionCounter = SectionCounter + 1
    StartSectionTimer = EndTime ' set to current time
    If SectionCounter >= MAX_SECTIONS Then
        Beep
        MsgBox ("End of Sequence")
        Unload Form1
        Exit Sub
    End If
    If TimerReset(SectionCounter) = 1 Then
        StartTimer = StartSectionTimer
    End If
    If QuestionReset(SectionCounter) = 1 Then
        DisplayQuestionCounterOffset = 0
    Else
        DisplayQuestionCounterOffset =
QuestionArray(SectionCounter - 1) + _
                DisplayQuestionCounterOffset
    End If
    QuestionCounter = 1
End If
'data is ready for display. DisplayQuestionCounter is the question number
'displayed on the screen.
DisplayQuestionCounter = DisplayQuestionCounterOffset +
        QuestionCounter
'display the question number, unless the current section is a pause
'section, with no questions programmed for it.
If (QuestionArray(SectionCounter) = 0) Then
    Text1.Text = ""
Else
    Text1.Text = DisplayQuestionCounter
End If
'Total time keeps track of the time since the last Time Reset. The number
'is converted into seconds and minutes and displayed. The prototype does
'not keep track of groups of sections longer than an hour. The section
'counter is displayed.
CurrentSeconds = Int(TotalTime) Mod 60
CurrentMinutes = Int(Int(TotalTime) / 60)
If (CurrentSeconds < 10) Then
    strCurrentSeconds = "0" + CStr(CurrentSeconds)
Else
    strCurrentSeconds = CStr(CurrentSeconds)
End If
If (CurrentMinutes < 10) Then
    strCurrentMinutes = "0" + CStr(CurrentMinutes)
Else
    strCurrentMinutes = CStr(CurrentMinutes)
End If
Text4.Text = strCurrentMinutes + ":" + strCurrentSeconds
Text3.Text = SectionCounter + 1
'The Time Transform function is in this case linear.
'The number of Ticks is the number of questions in this case.
'It can be changed to any functional transformation.
Function TimeTransform(iTime As Integer, iNumberOfTicks As
Integer, TotalSectionTime As Variant) As Integer
    Dim LinearTime As Double
    If iNumberOfTicks > 0 Then
        LinearTime = Int(iTime * 60 / iNumberOfTicks)
    Else
        LinearTime = iTime
    End If
    TimeTransform = Int(TotalSectionTime / LinearTime) + 1
End Function
```

What is claimed is:

1. A programmable machine for measuring time based on linear or non-linear programmable functions comprising:

a) a data entry unit to input parameters that describe at least one non-linear function as one of a plurality of distinct mathematical positive, monotonic functions;

b) an arithmetic logical computation unit that performs operations on numeric data, by receiving the input parameters and computing the plurality of functions, using time as the independent variable;

c) a memory for storing numeric parameters for functions; and d) a clock that generates equally spaced impulses, that are fed to the arithmetic logical unit for transformation.

2. A programmable machine for measuring time based on linear or non-linear programmable functions as claimed in claim 1, further comprising: a display means and display registers for storing data to be displayed by said display means.

3. A programmable machine for measuring time based on linear or non-linear programmable functions as claimed in claim 1, wherein said data entry unit is a button pad having provisions for inputting numeric data, switch mode commands, memory register navigational commands, and selection of pre-programmed functions or sets of functions.

4. A programmable machine for measuring time based on linear or non-linear programmable functions as claimed in claim 2, wherein said display is a liquid crystal or plasma display.

5. A programmable machine for measuring time based on linear or nonlinear programmable functions as claimed in claim 2 wherein said display,
when the running mode is selected, shows:
   a) time within sections until the timer counter is reset;
   b) section number;
   c) timer event number until the timer event counter is reset;
   d) pre-programmed effort selected; and
when the input mode is selected shows:
   a) time reserved for each section;
   b) section number;
   c) programmed function for the section;
   d) pre-programmed function set;
   f) alarm indicator; and
   g) timer mode indicator.

6. A programmable machine for measuring time based on linear or non-linear programmable functions as claimed in claim 2, wherein said display, when the running mode is selected, shows time either going up towards a total section time or to go down, from a total section time towards 0, depending on programmed timer mode.

7. A programmable machine for measuring time based on linear or non-linear programmable functions as claimed in claim 1, wherein said memory stores data for several sections to be programmed independently, each section containing information and parameters about the time transformation to be performed and the timer mode.

8. A programmable machine for measuring time based on linear or non-linear programmable functions as claimed in claim 1, wherein said arithmetic logical unit has a default linear function, for sections that are not programmed.

9. A programmable machine for measuring time based on linear or non-linear programmable functions as claimed in claim 1 further comprising a device that creates an audible alarm for each timer event counter increase and transition from use of use of distinct functions.

10. A programmable machine for measuring time based on linear or non-linear programmable functions as claimed in claim 1, wherein said arithmetic logical computation unit is a general purpose computation unit that executes programs in a pre-determined programming language and the specific functionality of time transformation with the purpose to create time events is defined by software.

11. An electronic programmable timer for pacing an exam questions, comprising:

a data entry unit to input parameters that describe a set of exam sections, a time allocated for the exam questions, a question difficulty, and the number of questions;

an arithmetic logical computation unit that performs operations on numeric data, computing a plurality of distinct functions of the input parameters, using time as the independent variable;

a memory for storing input parameters, timer event counters, and results of function computation; and an electronic clock that generates equally spaced impulses, that are fed to said arithmetic logical unit for transformation.

12. An electronic programmable timer as claimed in claim 11, further comprising a display means and display registers for storing data to be displayed by said display means.

13. An electronic programmable timer as claimed in claim 11, wherein said data entry unit is comprises a button pad having provisions for inputting numeric data, switch mode commands, memory register navigational commands, selection of pre-programmed exams, and reset intervals.

14. An electronic programmable timer as claimed in claim 12, wherein said display,
   when the running mode is selected, shows: time within sections until the timer counter is reset; section number; question number until the question counter is reset; pre-programmed effort selected; and
   when the input mode is selected shows: time reserved for each section; section number; pre-programmed exam set; alarm indicator; timer mode indicator; reset indicator for the question counter; and reset indicator for the time counter.

15. An electronic programmable timer as claimed in claim 11, wherein said button keyboard pad further comprises: a start/stop mode selection button; a section selection button; an option selection button; numeric buttons; a button that will automatically program the timer with default settings for the SAT; a button that will automatically program the timer with default settings for the PSAT; and buttons that can be custom programmed by the to match a particular exam and a particular user.

16. An electronic programmable timer as claimed in claim 11, wherein said electronic memory is adapted to store several sections to be programmed independently; each section containing information about the number of questions for the section, the length of time for the section, and information about resetting the question counter and/or the time counter at the beginning of the section.

17. An electronic programmable timer as claimed in claim 11, wherein said arithmetic logical computation unit converts time without transformation, for sections that are not programmed, to account for pauses or breaks in the effort, and converts time linearly, but with a slope different than 1, for programmed sections, the slope being computed from entered data about the number of questions and the time length of the section.

18. An electronic programmable timer as claimed in claim 12 further comprising a device that creates an audible alarm for each timer event counter increase and section counter change.

19. An electronic programmable timer as claimed in claim 11, further comprising the step of selecting a timer increment or a timer decrement mode.

20. An electronic programmable timer as claimed in claim 11, wherein said arithmetic logical computation unit is a general purpose logical computation unit that executes programs in a pre-determined programming language, and the specific functionality of time transformation is defined by software written in the pre-determined programming language.

* * * * *